United States Patent [19]

Barlage et al.

[11] Patent Number: 5,069,294
[45] Date of Patent: Dec. 3, 1991

[54] STUB-SHAFT POWERED SPINNING TILLER

[75] Inventors: Bruno Barlage; Franz-Josef Robert, both of Hörstel; Bernd Gattermann, Hude, all of Fed. Rep. of Germany

[73] Assignee: H. Niemeyer Söhne GmbH & Co. KG, Hörstel-Riesenback, Fed. Rep. of Germany

[21] Appl. No.: 525,279

[22] Filed: May 17, 1990

[30] Foreign Application Priority Data

May 19, 1989 [DE] Fed. Rep. of Germany ....... 3916267

[51] Int. Cl.[5] ...................... A01B 33/06; A01B 33/08
[52] U.S. Cl. .................................. 172/49.5; 172/125; 384/501; 384/505; 384/507
[58] Field of Search ................... 172/49.5, 52, 59, 111, 172/125; 74/606; 56/503, 255, DIG. 6; 384/501, 505, 506, 507, 512, 539, 903

[56] References Cited

U.S. PATENT DOCUMENTS

| 920,149 | 5/1909 | James | 384/505 |
| 1,063,079 | 5/1913 | Stevens | 172/49.5 |
| 1,301,295 | 4/1919 | Mossig | 384/507 |
| 1,622,578 | 3/1927 | Ellwein | 384/501 |
| 3,447,394 | 6/1969 | Wagner et al. | 384/505 X |
| 4,055,221 | 10/1977 | van der Lely | 172/49.5 |
| 4,299,291 | 11/1981 | Oberle | 172/49.5 |
| 4,465,143 | 8/1984 | van der Lely | 172/49.5 |
| 4,560,355 | 12/1985 | McCormick | 74/372 X |
| 4,889,190 | 12/1989 | Barlage et al. | 172/49.5 |

FOREIGN PATENT DOCUMENTS

| 2640766 | 3/1977 | Fed. Rep. of Germany . |
| 2947340 | 6/1980 | Fed. Rep. of Germany . |
| 2200826 | 8/1988 | United Kingdom | 172/111 |

OTHER PUBLICATIONS

Dowdeswell Power Harrow Sales Brochure, Dowdeswell Engineering Co. Ltd.

Primary Examiner—Dennis L. Taylor
Assistant Examiner—Jeffrey L. Thompson
Attorney, Agent, or Firm—Jordan and Hamburg

[57] ABSTRACT

A powered spinning tiller with a box beam extending transversely of the direction of travel includes a plurality of spinners each consisting of a prong holder and a drive gear disposed rotatably on bearings side by side, adjacent prong holders being driven to rotate in opposite directions by the gear drive. In order to create an economical method of constructing a spinning tiller by the simplest means, provision is made for each spinner to be journaled on only one bearing and/or bearing ring which is situated in a single plane.

31 Claims, 9 Drawing Sheets

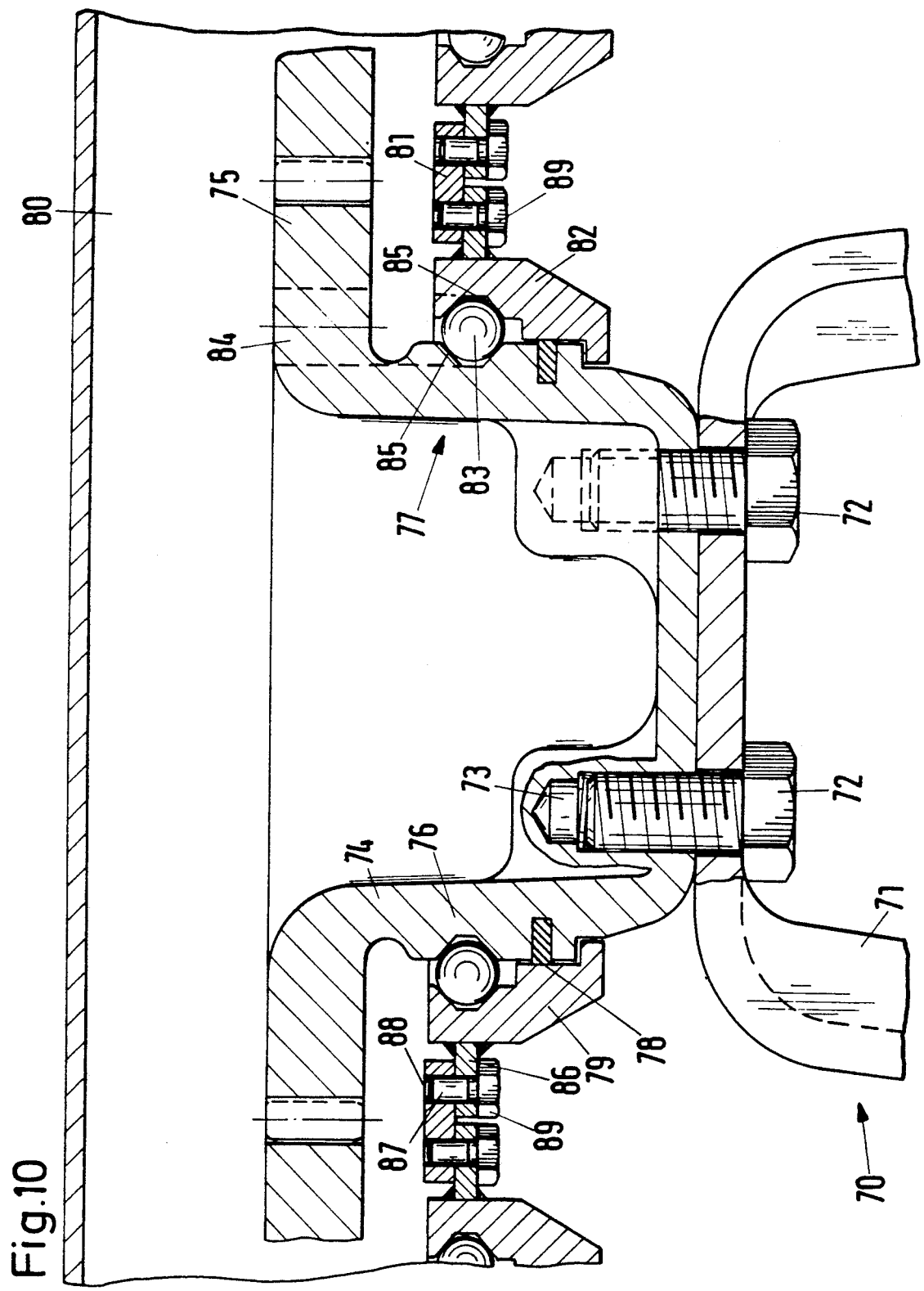

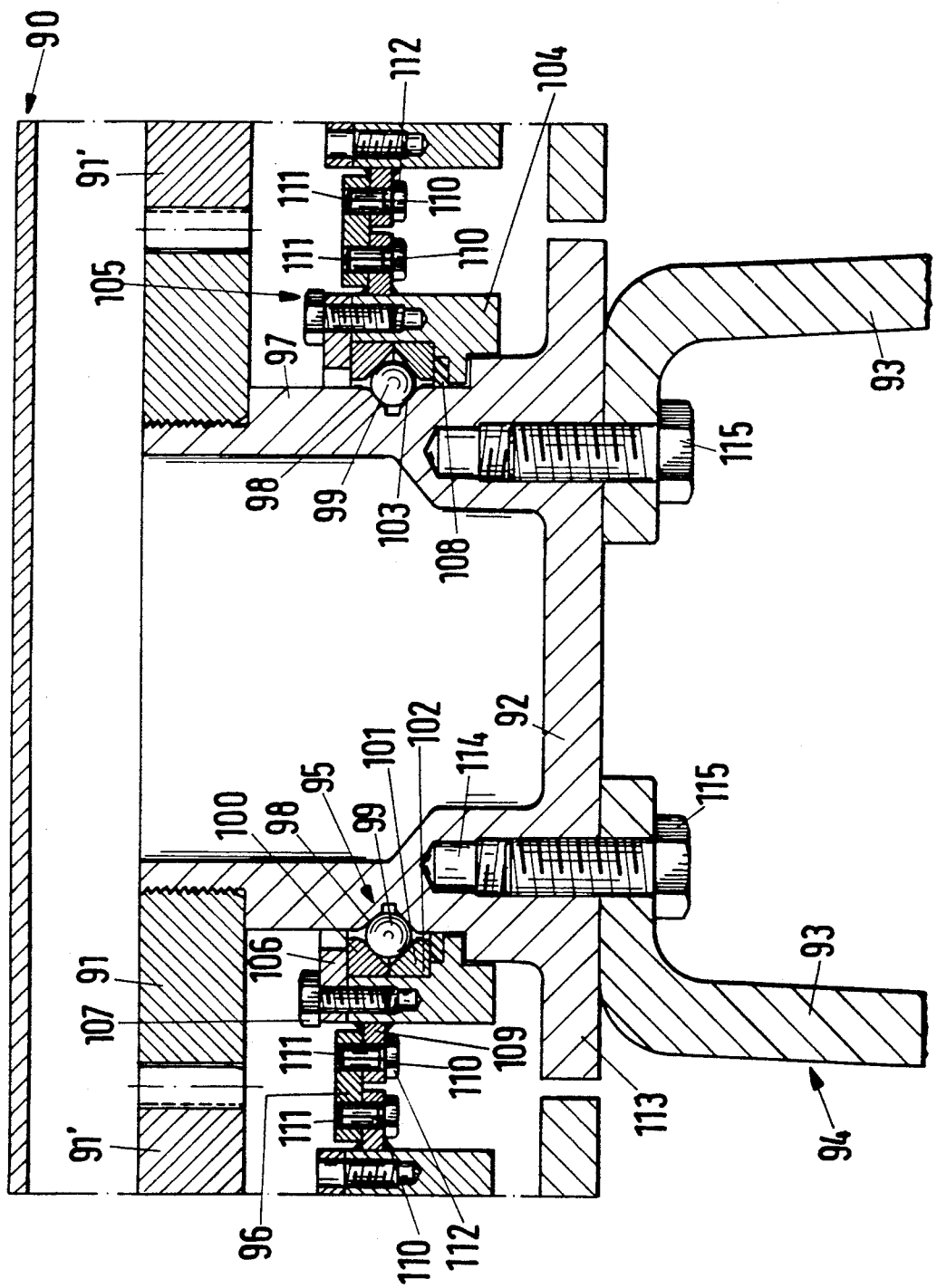

STUB-SHAFT POWERED SPINNING TILLER

BACKGROUND OF THE INVENTION

The invention relates to a stub-shaft powered spinning tiller with a box beam extending transversely of the direction of travel, in which a plurality of spinners are disposed for rotation side by side on bearings, and adjacent spinners are driven in opposite senses through a spur gear drive.

A soil tilling machine constructed in this manner has already been disclosed in German patent disclosure document 26 40 766. This tilling machine contains a frame part consisting of sheet metal of U-shaped cross section running transversely of the direction of travel. To this frame part are fastened tilling tools rotatable about upwardly pointing, vertical shafts. The shafts of the various tools arranged side by side are supported in a bearing case by two bearings mounted at a distance apart, one over the other. The bearings rest one on the bottom and the other on the top of a shoulder in the bearing case. The upper bearing is held on the top by a nut which is threaded onto a threaded portion of the shaft. Between the nut and the bearing a gasket is provided. The bottom bearing rests on the bottom on a shoulder of the shaft, this shoulder being held by a locking ring and the hub of a holder holding the tool. The lock ring closes off the bottom of the bearing case. Each bearing case of the individual shafts disposed side by side is supported by the frame part. This supporting of the individual bearing houses in the frame part of the tilling machine is very complex and also very troublesome in regard to installation. The configuration of the bearing case for the journaling of each particular spinner drive shaft, in which the individual shafts disposed side by side are driven by actively engaged spur gears, is very complicated and therefore expensive.

Furthermore, a spinning tiller is disclosed by German Patent 29 47 340 which has a box beam in which a plurality of spinners are held each by a shaft which is carried by at least two bearings disposed in a case joined to the box beam bottom, a reinforcing piece being associated with each case, surrounding the case and fastened to the bottom of the box beam by fastening means. The shafts on which the tool holders with their tilling tools are disposed side by side extend upwardly into the interior of the box beam and are provided each with a flange on its upper end, on which flange a spur gear is mounted. These spur gears of the spinners disposed side by side are engaged with one another and form the spur gear drive. In this case the journaling of the drive shaft on which the spinners are disposed is accomplished by means of two bearings which are disposed in a special bearing case, this bearing case being bolted to the box beam bottom and serving simultaneously as a reinforcement of the box beam bottom.

In this known spinning tiller the drive shaft for the individual spinners is also journaled in two bearings, and a special bearing case has to be made to accommodate these bearings and has to be mounted in the box beam bottom of the spinning tiller, and this is very complicated and increases the cost of manufacturing the spinning tiller. It is the object of the invention to create a lower-cost method of constructing a spinning tiller by the simplest means of construction.

SUMMARY OF THE INVENTION

This object is achieved in the manner according to the invention in that each spinner is journaled in the box beam in only a single bearing and/or bearing ring which is situated in a single plane. As a result, a less expensive journaling is created for the drive shafts on which the individual spinners are disposed side by side, because only one bearing is used for each spinner. Since the single bearing is journaled in an advantageous manner on the bottom of the box beam, additional advantageous possibilities are obtained as a result.

A very economical arrangement of the bearing for journaling the individual spinners is achieved by disposing the bearing directly on and/or in the outside bearing ring of the spinner. In this manner the requirement is created that the bearing be able to be integrated directly, in an inexpensive manner, into the outer bearing ring of the spinner.

If the single bearing in accord with the invention is used, to enable the forces to be withstood well by the bearing, provision is made in accord with the invention for the bearing to have a relatively large diameter corresponding to at least one-third of the diameter of the working reach of the spinner prongs, and/or to half of the distance between the axes of rotation of the adjacent spinners, but smaller than the distance between the shafts.

An extremely advantageous configuration of the spinner and of the desirable integration of the bearing into the spinners and into the bottom of the box beam which it entails, as well as a good transmission of power, is achieved in accordance with the invention by making the tool holder cup-shaped, by fastening the prongs to the bottom side or in the lower cylindrical part of the pot-shaped tool holder, by fastening the spur gear of the spur gear train to the upper side of the cup-shaped tool holder, and by disposing the single bearing between the spur gear and the prong mounting.

Then, provision is made in accordance with the invention for a circumferential groove to be created on the outside of the cup-shaped tool holder to serve as a rolling-body bearing race to accommodate the balls of a bearing in the form of a ball bearing, and for a likewise circumferential groove to be created in the bottom of the box beam also to contain the balls of the ball bearing for the mounting of each spinner. As a result of these measures, the single bearing provided in accordance with the invention to serve for mounting the spinner is integrated directly into the prong holder and into the bearing flange situated on the bottom of the box beam. The grooves are located on the one hand directly in the cup-shaped prong holders and on the other hand in the bottom of the box beam. The additional bearing such as has conventionally been used, is no longer used. The bearing is directly integrated into the prong holder and into the bottom of the box beam.

To facilitate assembly, provision is made in accordance with the invention for at least one opening to be provided in the area of the circumferential groove, through which the balls of the single bearing can be loaded, and for this opening or openings to be closed by one or more plugs. As a result of this measure, the balls necessary for the ball bearing in accordance with the invention can be loaded in through this opening. By loading the balls through the opening in the groove, the spinner or prong holder can be installed in the box beam bottom and held by these balls. To assure the troublefree operation of the bearing, the opening for loading the balls is located always in the unstressed part of the groove. One advantageous location of the opening is in the side wall of the cup-shaped spinner. It is also possible, however, for the opening for loading balls into the bearing to be located in the stationary side wall in the spinner trough of the box beam. Instead of using a plug to close the opening, it is also possible to provide the opening with a slightly smaller diameter than the balls; the balls must then be pressed through this opening into the groove.

To achieve a good accuracy of fit and good load-bearing capacity of the bearing according to the invention, the ball bearing is to be a four-point bearing. In this case the ball bearing can be in the form of a so-called "full ball bearing." It is also possible, however, for the ball bearing in accordance with the invention to be a so-called "caged ball bearing." Instead of the integrated arrangement of the bearing in the cup-shaped prong holder and the bearing flange, it is also possible to use a separate ball bearing between the prong holder and the box beam bottom, the ball bearing having a large diameter. Furthermore, it is also possible, in the case of the integrated configuration, to make the bearing rings removable, so that then the balls can first be loaded in order then to insert the bearing rings after the balls have been loaded. This is an alternative to the configuration in which the balls can be loaded into the groove through an opening.

To simplify the installation of the prong holders with their corresponding components, provision is made in accordance with the invention for the prong holders and the outer bearing ring to be pre-assembled as a ready-assembled bearing, and to fasten them or flange-mount them as one assembly unit to the box beam bottom. These pre-assembled units can then simply be flange-mounted by means of screws or other fastening means to the box beam bottom. To assure reliable and precise driving of the prong holders, provision is made according to the invention for the assembly unit to be precisely adjusted in the box beam by centering means located in the outer bearing ring, in conjunction with counter-centering means provided on the box beam bottom.

To simplify the assembly of the prong holders with the spur gears necessary for the drive, provision is made in accordance with the invention for the creation of openings in the box beam bottom through which the pre-assembled assembly units, consisting of prong holders, outer bearing ring and spur gear, are introduced, and for these openings to be of such dimensions that the assembly units can be inserted and installed into the box beam bottom from below.

Furthermore, provision is made in accordance with the invention for a seal to be associated with each bearing supporting the prong holder in the box beam bottom to prevent the escape of lubricants contained in the box beam and at the same time seal the beam against the penetration of dirt etc. from the outside. As a result, a simple seal is achieved. An especially simple seal can be provided by making the seal a plastic ring consisting, preferably of a foam plastic material.

In an especially preferred embodiment, provision is made in accordance with the invention for the prong holder, the drive gear and the inside part of the single bearing to be made from one piece. The result is an especially simple and inexpensive method for the manufacture of spinning tillers, plus an especially simple installation of the individual components in the box beam bottom.

To assure an accurate and satisfactory positioning of the prongs of adjacent spinners with respect to one another, provision is made in accord with the invention for an antirotational locking means to be disposed on the drive gear, this antirotational locking means being configured as a radial locking means.

In an especially desirable and simple embodiment of the invention, a circumferential groove configured as a race for the rolling bodies is provided on the outside of the cup-shaped prong holder to accommodate the balls of the bearing configured as a ball bearing, the inner bearing ring is integrated into the prong holder, and the outer bearing ring consists of two halves which can be separated in a horizontal plane. As a result of these measures a bearing for the spinners journaled in the bottom of the box beam can be manufactured in a very simple manner, the assembly of the bearing from the separable outer bearing ring being very uncomplicated.

To prevent stones from jamming between adjacent spinners, provision is made in the bottom part of each prong holder, in accordance with the invention, for the prong holder to have a circular, plate-like closure in its bottom area.

Additional details of the invention will be found in the rest of the subordinate claims, the description of exampled, and the accompanying drawings.

BRIEF DESCRIPTION OF THE DRAWINGS

FIG. 10 is an enlarged fragmentary cross section of an additional construction and journaling of the prong holders in the box beam bottom in accordance with the invention, and FIG. 11 shows another configuration in accordance with the invention of the journaling of the prong holders in the box beam bottom.

DESCRIPTION OF THE PREFERRED EMBODIMENTS

Figure 1:
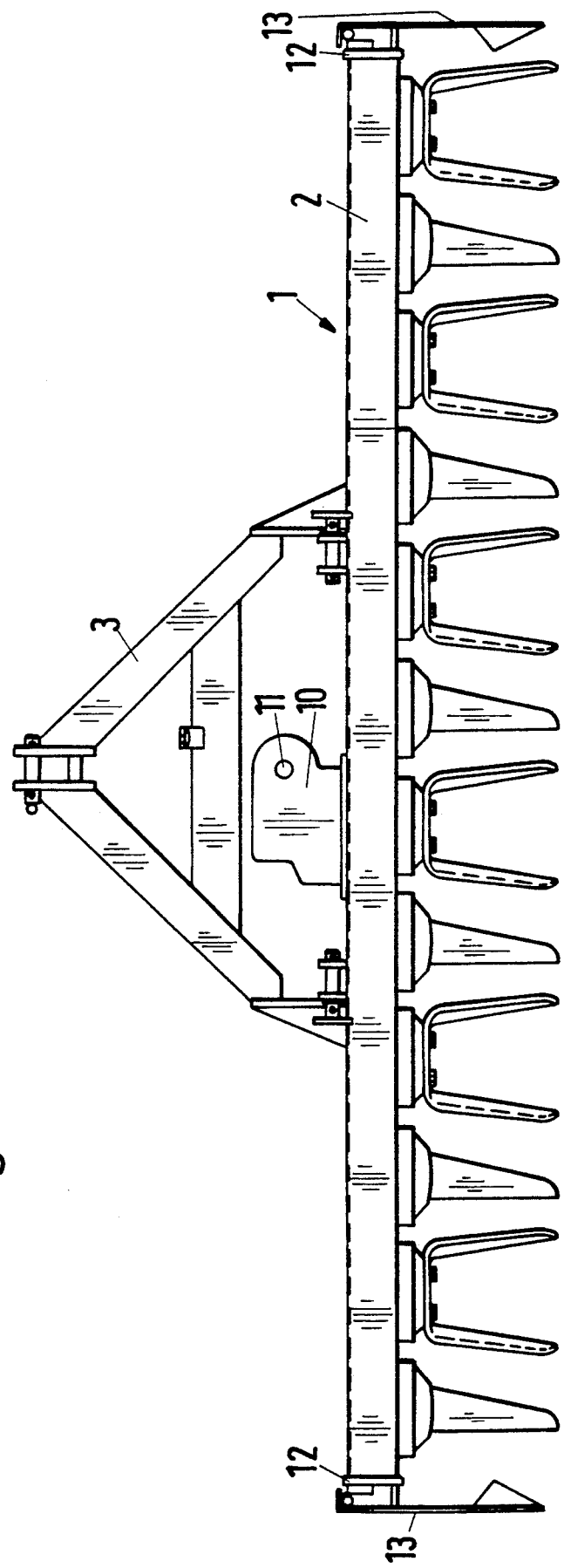
FIG. 1 shows a diagrammatic front view of a spinning tiller configured in accordance with the invention.
Figure 2:
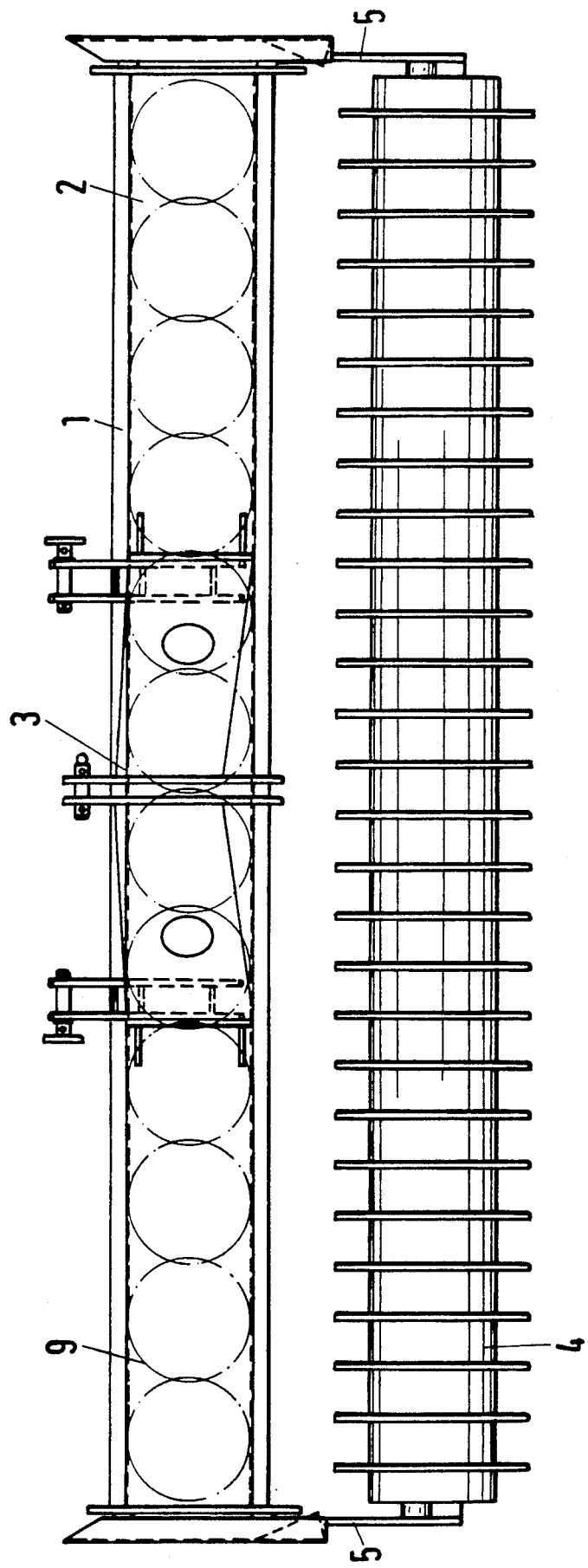
FIG. 2 shows the spinning tiller of FIG. 1 in a top view; but with a follower roller of adjustable height disposed in back of the spinners for establishing the working depth of the soil working tools of the spinning tiller.

The spinning tiller 1 according to FIGS. 1 and 2 has a box beam 2. On top of the box beam 2 is a three-point hitch 3 for connecting the spinning tiller 1 to the three-point hydraulic lift of a tractor. Behind the spinning tiller 1 is a follower roller 4. This follower roller 4 has at its two outer ends the supporting arms 5 by which it is linked with the ends of the box beam 2 of the spinning tiller 1. By known means, which therefore are not represented in detail, the follower roller 4 is adjustable in height with respect to the spinning tiller 1 and adjustable with respect to the box beam 2.

Spinners 6 are journalled in the box beam 3 as will be explained further below. The spinners 6 consist each of cup-shaped prong holders 7, prongs 8 configured as soil tilling tools, and a spur gear fastened on each prong holder 7. Spinners 6 adjacent one another are driven so as to rotate in opposite directions by the spur gear train 9 located in the box beam 2. This spur gear train 9 is in a driven connection with a central drive 10 fastened to the box beam. A tumbler shaft is connected to a connecting shaft 11 of the central drive 10 and is connected to the power take-off shaft of the tractor pulling the spinning tiller 1. Thus, the spinners 6 and the prongs 8 on the spinners can be driven by the power take-off shaft of a tractor pulling the spinning tiller. By means of the prongs 8, which rotate to till the soil, seed-bed preparation or tilling can be performed. At the lateral ends 12 of the box beam 2 are the side shields 13 which prevent lateral displacement of the earth out of the working range of the spinning tiller. The spur gear train 9, as shown in FIGS. 2 to 5, is situated in the box beam 2 and consists of the spur gears 14 and 15 fastened on the prong holders 7. The spur gears 14 and 15 are threaded onto the prong holders 7 by means of the threads 16 and 17. The spinner 6 rotates in the direction of arrow 18 as seen in plan, while the spinner 6' rotates in the direction of arrow 19. That is, the adjacent spinners 6 and 6' rotate in opposite directions. To achieve an opposite sense of rotation of the spinners 6 and 6', i.e., to assure proper driving of the spinners 6 and 6', the thread 16 is a left-hand thread, while thread 17 of spinner 6' is a right-hand thread. Consequently, as the spinners 6 and 6' are driven, the spur gears 14 and 15 automatically tighten themselves on them. The prongs 8 and 8', configured as double prongs, are fastened on the spinners 6 and 6' by means of the bolts 20. For this purpose, the fastening means in the form of blind holes 21 are provided in the prong holders 7 and the bolts 20 are driven into them through the spinners 6.

The prong holders 7 are cup-shaped and journaled in the box beam 2 on a single bearing 22. This bearing 22 is situated in a single plane. The single bearing 22 is fastened to the bottom 23 of the box beam, i.e., the outer bearing ring 24 is bolted by means of bolts 25 to the box beam bottom 23 through the welded lugs 26. The inner bearing ring 27 is on the outside 28 of the cup-shaped prong holder 7 of the spinner 6 or 6', and is thus integrated into the prong holder 7. It is formed by the race 30 in the form of a groove 29 for the rolling means in the form of balls 31. The outer bearing ring 24 contains the race 32 for the bearing balls 31. The bearing 22 is configured as a four-point bearing, the ball races 30 and 32 consisting of two arcs running together, so that the balls 31 contact the latter at four points. The bearing 22 is configured such that an opening 33 is provided in the area of the races 30 and 32 between the inner ring 27 and the outer ring 24 of the bearing, and the balls 31 for the single bearing 22 are loaded through the opening. For the secure arrangement of the balls 31 in the bearing 22 this opening is so configured that the opening 33 has a slightly smaller diameter than the balls 31, and the balls 31 are then pressed through this opening 33 into the races 30 and 32 of the bearing 22. It is also possible, however, to configure this opening 33 such that the mouth of the opening 33 through which the balls are loaded is closed by means of a plug for the secure disposition of the balls 31 in the bearing 22. The opening 33 for loading the balls 31 into the bearing 22 is in each case situated in the unstressed area of the races 30 and 32 of the bearing 22, so that the faultless operation of the bearing is assured. To prevent lubricants in the box beam 2 from leaking out and at the same time provide a seal against dirt etc. penetrating into the bearing 22, a circumferential seal 34 is provided on each bearing 22 of the individual prong holders 7. The surface on which this seal 34 runs is integrated into the outer bearing ring 24.

The soil tilling tools in the form of double prongs 8 and 8' are fastened by means of the bolts 20 to the cup-shaped prong holder 7 bearing on the outside 35 in the upper part 36 a circumferential thread 16 and 17, respectively. The prongs 8 and 8' are crowned at their upper surface 37 in contact with the prong holder 7.

The installation of the spinners 6 and 6' in the box beam 2 is performed such that the outer bearing ring 24, the prong holder 7 with the prongs 8 and 8' and the spur gears 14 and 15 disposed on the prong holder 7 form a single assembly which is inserted into the box beam 2 from below through openings in the box beam bottom 23. The installation of this assembly consisting of individual components is performed by first inserting the seal 34 into the prong holder 7 and then placing the outer bearing ring 24 downward over the cup-shaped prong holder 7 until it reaches its appropriate position. Then the balls 31 are loaded through the opening 33 into the groove 29 formed by the ball races 30 and 31, and the ball bearing 22 is then ready for use. To enable this single bearing 22 to withstand the forces acting on the bearing 22, this bearing 22 has a large diameter. Then the spur gears 14 and 15 are threaded onto the cup-shaped prong holder 7, the way a nut is threaded onto a bolt, for example. Since the adjacent spinners 6 and 6' are driven in opposite directions, the adjacent prong holders 7 are alternately provided with right-hand and left-hand threads 16 and 17, respectively. This brings it about that, when the spinners 6 and 6' are driven the spur gears 14 and 15, respectively, automatically tighten themselves. For the simple installation of these spur gears 14 and 15 on their prong holders 7, with the individual, adjacent prongs 8 and 8', respectively, in a precisely defined position in relation to one another so as to assure proper tilling of the soil, both the spur gears 14 and 15 and the corresponding prong holder 29 have threads 16 and 17, respectively, with a precisely defined starting point, so that the adjacent spinners 6 and 6' can be installed such that the prongs 8 and 8', respectively, will assume a precisely defined position in relation to one another.

This pre-installed assembly consisting of the individual components is then inserted from below into the box beam 2 with the prongs 8 and 8' of adjacent spinners 6 and 6' in their appropriate positions. Then, to assure a reliable and precise driving of the prong holders 7, this assembly is adjusted by means of the centering elements 38 at the lugs 26 of the outer bearing ring which cooperate with counter-centering elements 39 on the box beam bottom 23 and fixed by means of bolts 25 to the bottom 23 of the box beam 2. Since it is also necessary for the interacting spur gears 14 and 15 to assume a precisely defined position in relation to one another, marks are provided for the purpose on the spur gears 14 and 15.

Since the single bearing 22 is directly integrated into the prong holder 7 and into the outer bearing ring 24 that is bolted to the box beam bottom 23 and thus it is directly integrated into the box beam bottom, the result is an especially simple journaling of the individual spinners 6 and 6' situated side by side in a spinning tiller.

Figure 3:
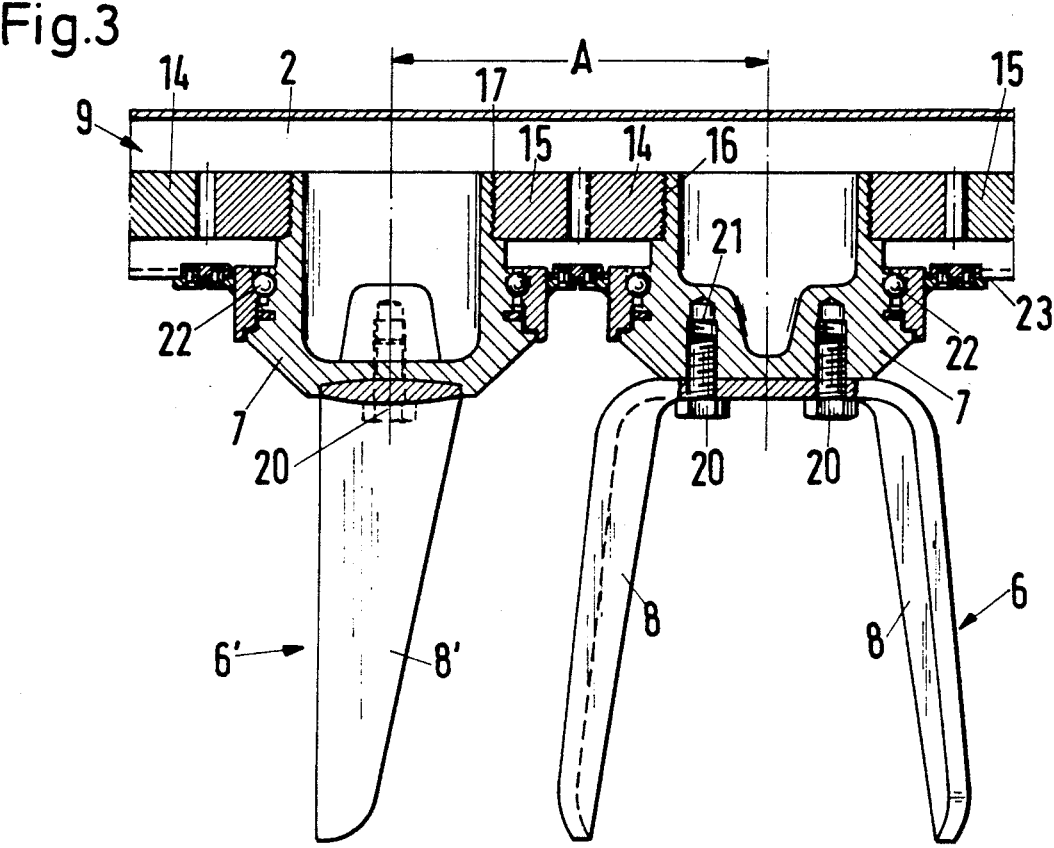
FIG. 3 is an enlarged fragmentary longitudinal section of the arrangement of the spinners in the box beam bottom, in accordance with the invention, taken along the line III—III in FIG. 4.
Figure 4:
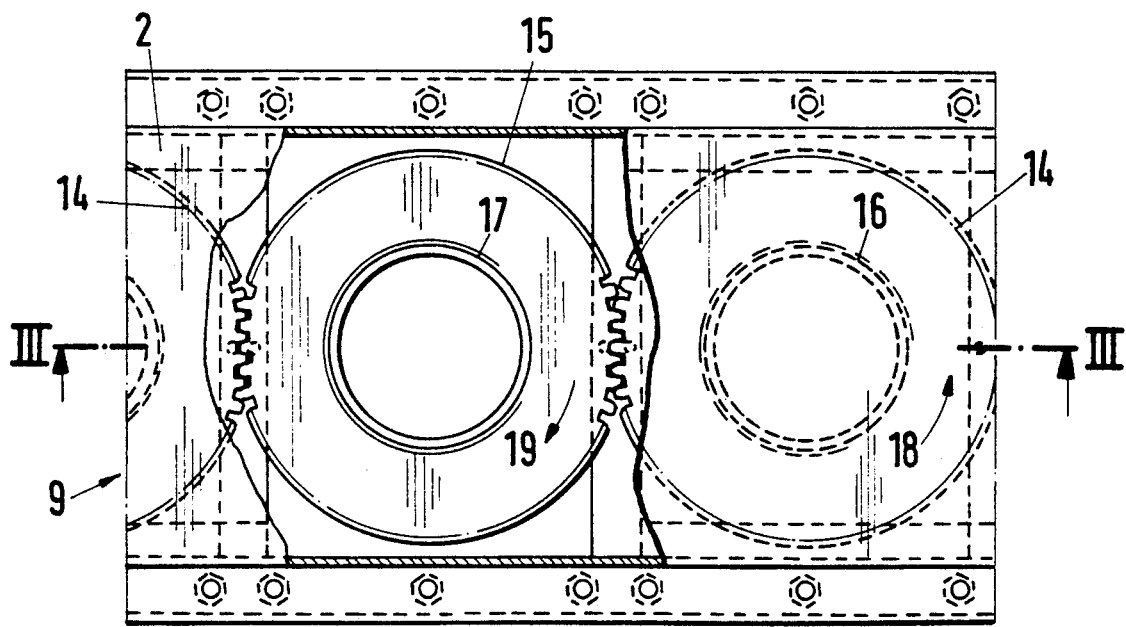
FIG. 4 is a plan view of the box beam bottom on an enlarged scale.
Figure 5:
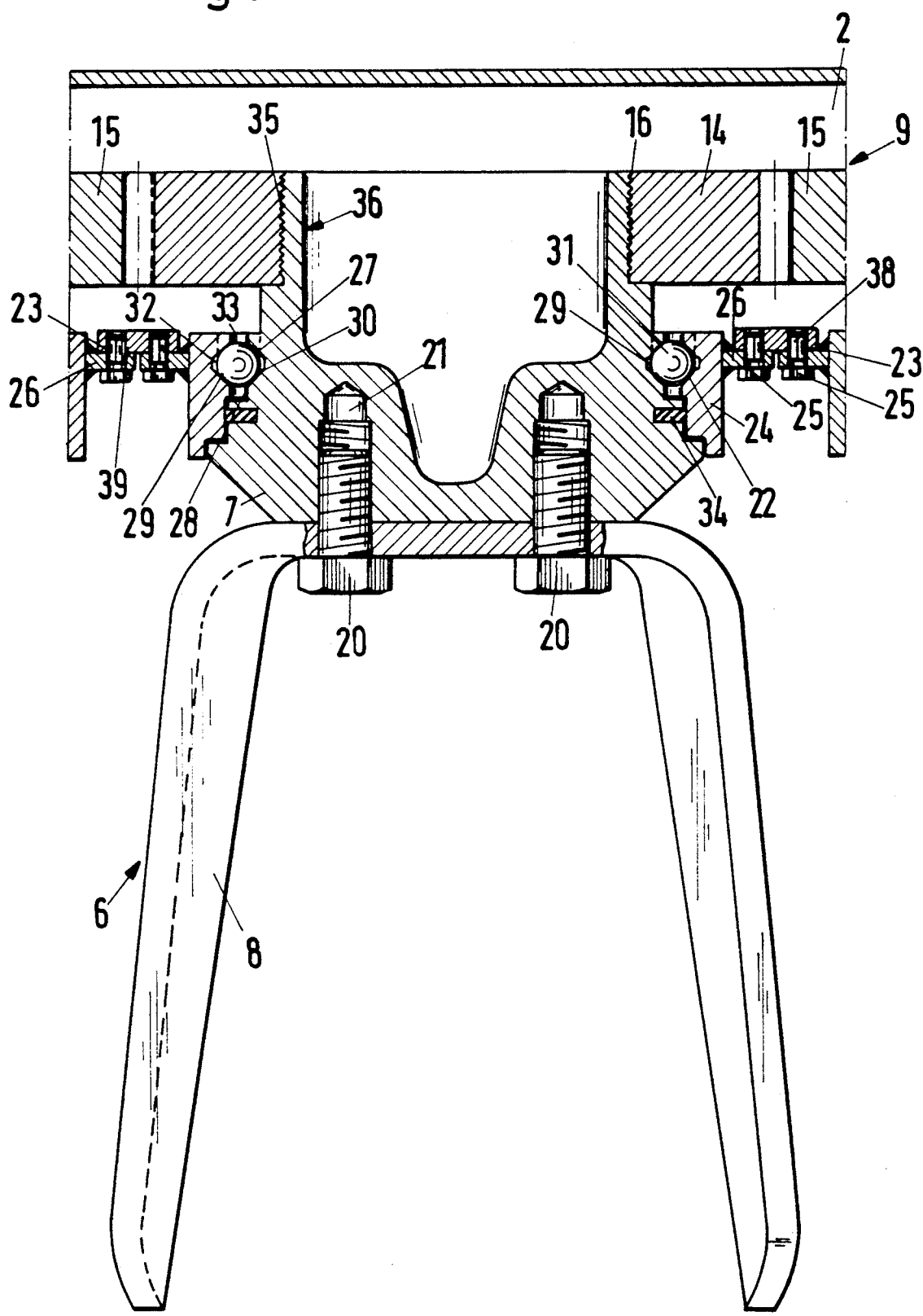
FIG. 5 is a more greatly enlarged representation of the arrangement of a spinner in the box beam as represented in FIG. 3.
Figure 6:
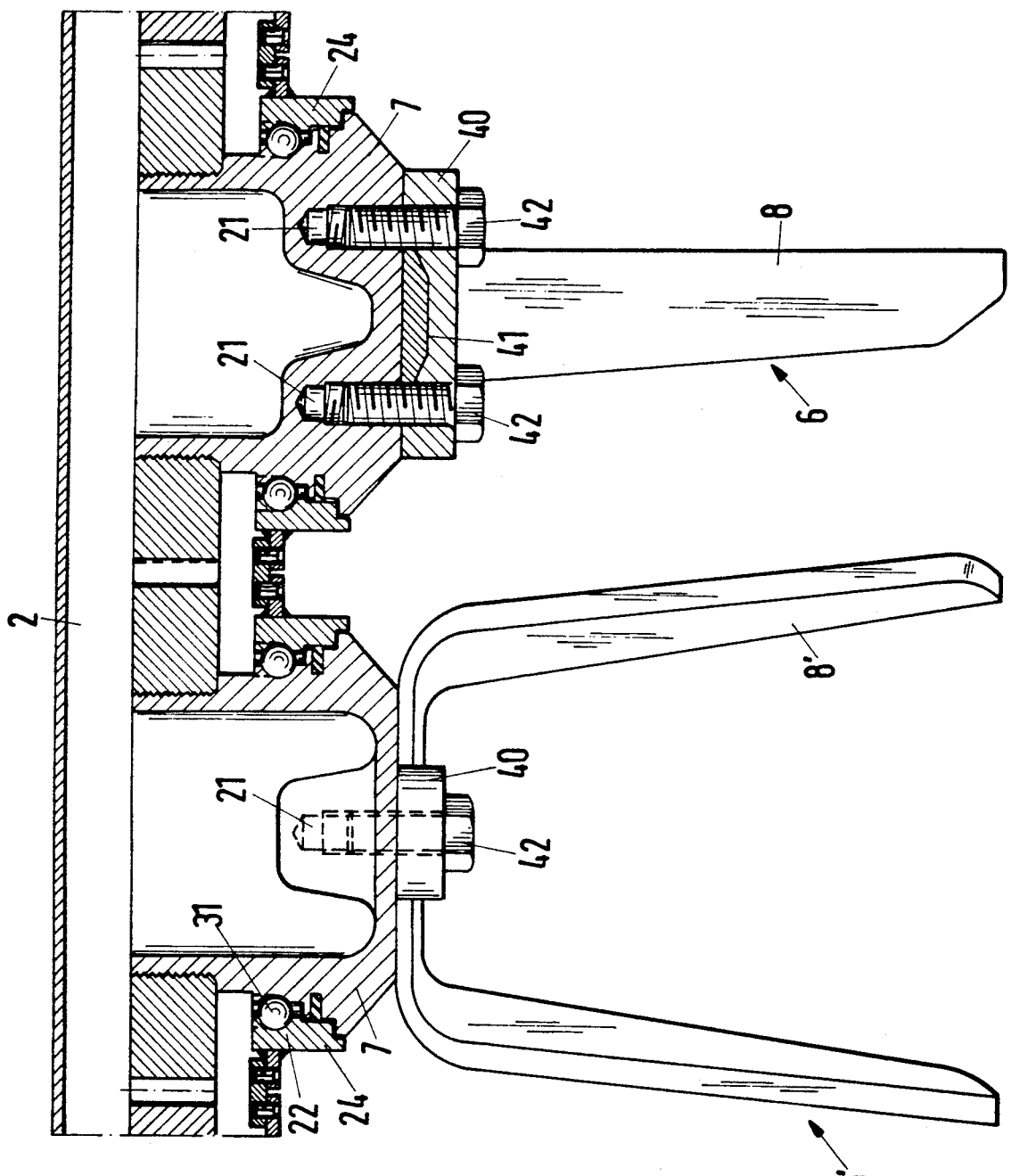
FIG. 6 shows a different fastening of the prongs to the prong holders of FIG. 3 in the same manner as in FIG. 3.

FIG. 6 differs from FIGS. 3 to 5 only in the arrangement of the double prongs 8 and 8' of the spinners 6 and 6' fastened by means of the clamp piece 40 to the prong holder 7. This clamp piece 40 has the cavity 41 which matches the shape of the double prong 8 and 8' in this area. This clamp piece 40 is bolted to the prong holder 7 by the two bolts 42.

Figure 7:
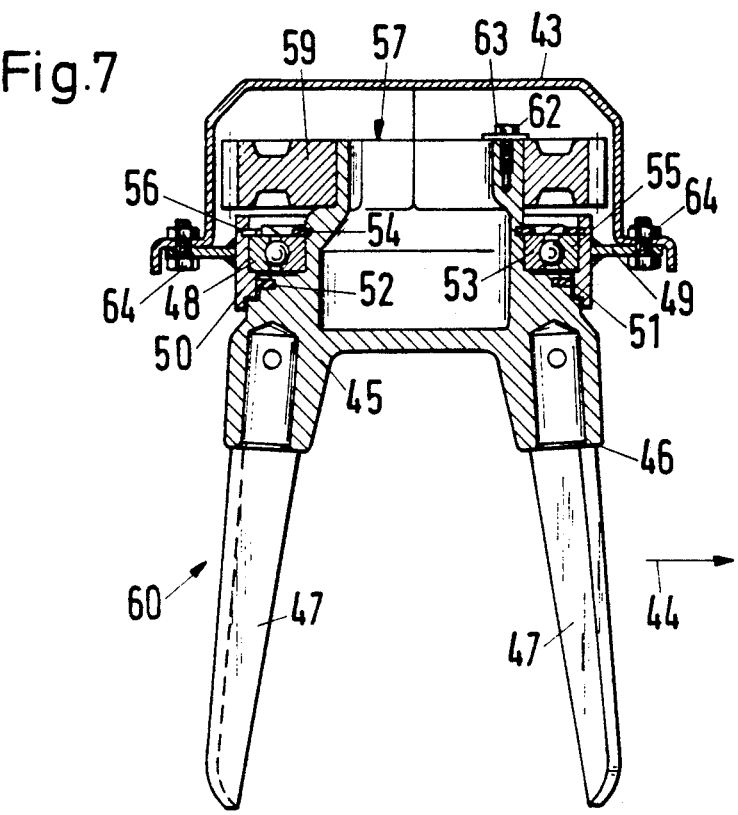
FIG. 7 shows another arrangement of the prong holders in the box beam bottom in accordance with the invention, and is a cross-sectional view taken along the line VII—VII in FIG. 8.
Figure 8:
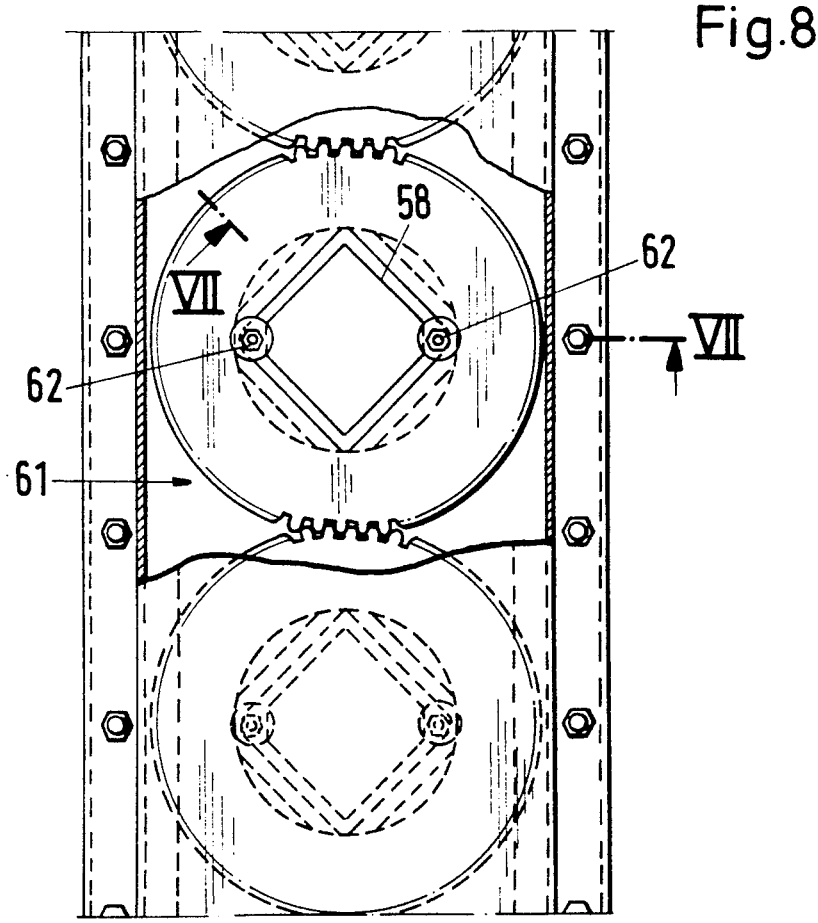
FIG. 8 is a top view of the arrangement of the spur gears on the spinners, corresponding to FIG. 7.

FIG. 7 is an elevation in cross section of the box beam 43 taken transversely of the direction of travel 44. The prong holder 45 is again of cup-shaped configuration, the individual prongs 47 being fastened directly to the prong holder 45 at the bottom 46. The prong holder 45 is journaled on the single bearing 48 in the bottom 49 of the box beam 43, the bearing 48 being situated in a single plane. In this case the bearing 48 is fastened directly to the prong holder 45. This bearing 48 is configured as a separate ball bearing disposed between the prong holder 45 and the bottom 49 of the box beam, and it has a large diameter to withstand the forces involved. A bearing flange 50 is welded in the box beam bottom 49 to accommodate the bearing 48. A contact surface 51 for a seal 52 disposed in the prong holder 45 is integrated into this bearing flange 50. The inner bearing ring 53 thrusts against the prong holder 45, the inner bearing ring 53 of bearing 48 being secured to the prong holder 45 by means of a snap ring 54. The outer bearing ring 55 of bearing 48 is held in the bearing flange 50, and is secured axially by means of a snap ring 56. The seal 52 associated with each bearing 48 prevents the escape of lubricants contained in the box beam 43 and at the same time seals the bearing against the penetration of dirt etc. from without.

The cup-shaped prong holder 45 has at its top 57 the square profile 58 which serves for the nonrotating mounting of the spur gear 59 of each spinner 60 of the spur gear train 61. The two bolts 62 are configured as clamping means 63 and secure the spur gear 59 on the square profile 58 of the prong holder 45. The bottom 49 of the box beam 43 is bolted to the latter by means of the bolts 64. The installation of the individual spinners 60 side by side on the box beam bottom 49 is performed in the following manner:

First the bearing 48 is inserted into the bearing flange 50 welded to the box beam bottom 49 and secured by means of the snap ring 56. Then the prong holder 45 bearing the seal 52 is inserted from below into the box beam bottom 49, the inner bearing ring 53 cooperating with the prong holder 45. Then the snap ring 54 is mounted on the prong holder 45, so that all components are definitely fastened. Then, before the spur gear 59 is installed, the spinners 60 of adjacent spinners 60 are associated offset from one another in the appropriate manner. After the spur gear 59 is inserted, the spur gear 59 is secured on the prong holder 45 by threading into the prong holder the clamp means 63 consisting each of a bolt 62 and a washer.

In this embodiment, too, the individual spinners 60 disposed side by side are driven in opposite senses of rotation by the spur gear train 61.

Figure 9:
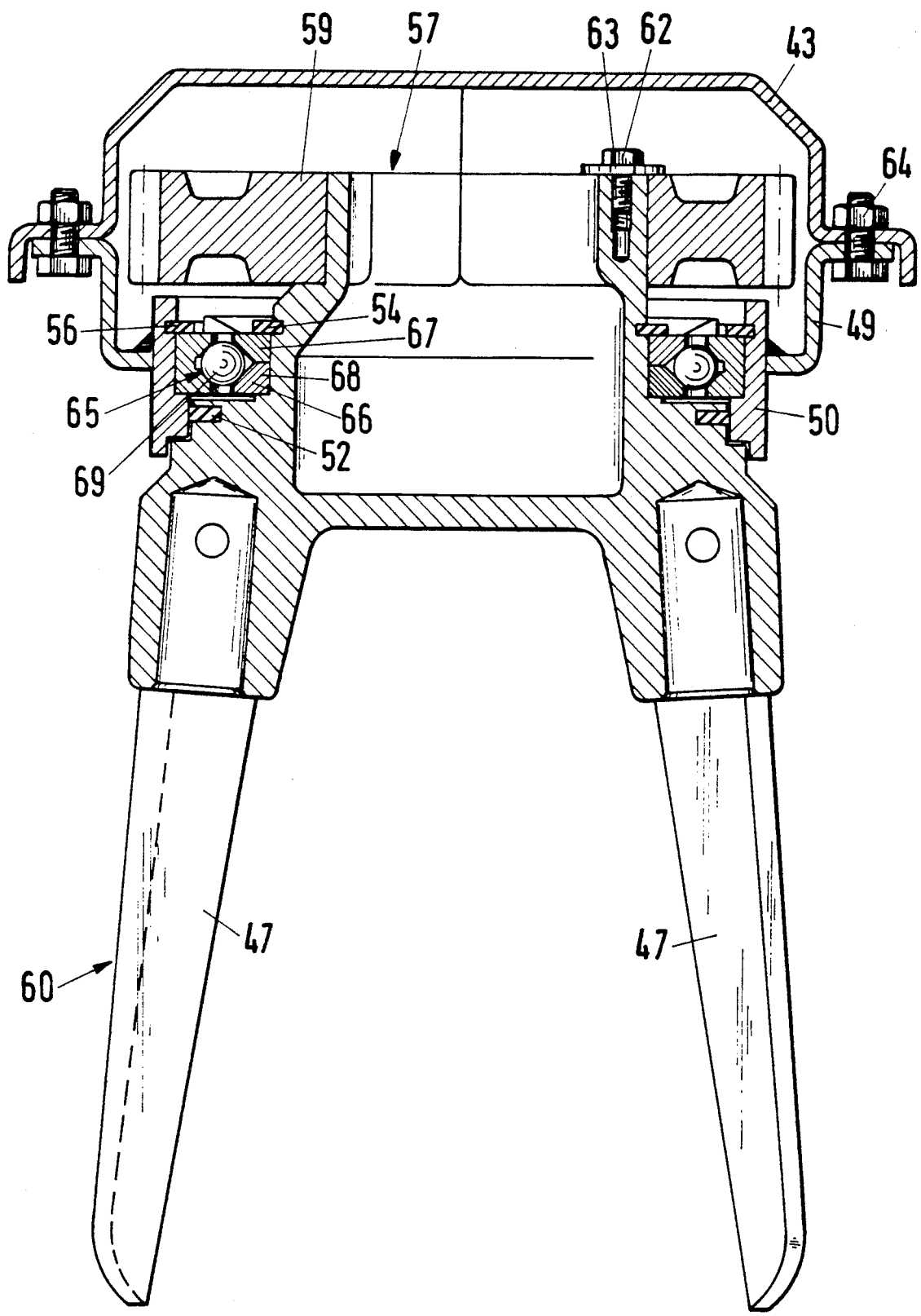
FIG. 9 is an enlarged representation of the spinner of FIG. 7, but with a differently made bearing.

FIG. 9 differs only in a differently constructed journaling of the prong holder 45. In this case the bearing 48 of FIG. 1 has been replaced by the bearing 65. This bearing 65, configured as a four-point bearing, has the inner bearing ring 66 which consists of the two bearing halves 67 and 68 which are separable in a horizontal plane. Due to the separable configuration of the inner ring 66 of bearing 65, the bearing half 67 can be removed for the loading of the balls 69, and after they are loaded can be put back into use. This bearing 65 is secured to the prong holder 45 in the same manner as in the case of bearing 48 in FIG. 7.

FIG. 10 shows another possibility for the configuration of the driving of the spinners 70 of a spinning tiller wherein they are arrayed side by side. The spinners 70 consist of the prongs 71 of double configuration, which are bolted by means of bolts 72 to the prong holders 74 of cup-shaped construction bearing the blind holes 73. In the configuration of the drive for the spinners 70 of FIG. 10, the prong holders 74, the driving gear in the form of spur gear 75, and the inner part 76, i.e., the inner bearing ring of the single bearing 77, consist of one piece. This one-piece construction can be, for example, a casting or a piece formed from metal plate, or else it can be a forging. If it is made from a casting, the teeth of the spur gear 75 are first rough-cast and then machined. If this part is formed from metal plate it is possible, for example, to make the teeth of the spur gear 75 rolled teeth, and if it is made as a forging the teeth of the spur gear 75 are die-forged, for example.

The installation of this one-piece for driving the spinner 70 is performed as follows:

First the seal 78 is inserted into the cup-shaped prong holder 74 and then the latter is introduced into the bearing flange 79. This bearing flange 79 is fastened to the box beam bottom 81 and bears the contact surface for the seal 78 and the outer bearing ring 82 for the bearing 77. This bearing 77 is a four-point bearing. After this component consisting of the prong holder 74, the drive gear 75 and the inner part 76 of bearing 77, has been introduced into this bearing flange 79, the balls 83 for the bearing 77 are loaded into the groove 85 of the bearing 77 through the loading opening 84 situated in the spur gear 75, until the groove 85 running all the way around the prong holder 74 is filled with balls 83. By filling this groove 85 with the balls 83, the component made in one piece and containing the prong holder 74, the drive gear 75 and the inner part 76 of the single bearing 77 is axially secured in the bearing flange 79. After that, this preassembled component of the spinner 70 is inserted from below through the opening in the box beam bottom 81 into the box beam 80. In order to install this spinner 70 properly in the box beam bottom 71 with the adjacent spinners 70 arranged offset from one another, the lugs 86 which are welded onto each bearing flange 79 and by which the bearing flange 79 is bolted to the box beam bottom 81, are equipped with the centering elements 87 which cooperate with the counter-centering elements 88 in the box beam bottom 81. Then, by means of the bolts 89, the prong holders 70 are fastened to the box beam bottom 81 of the spinning tiller.

FIG. 11 is a cross section of the box beam 90 in which the spur gears 91 and 91' are threaded side-by-side onto the cup-shaped prong holders 92. The spur gear 91, prong holder 92 and the prongs 93 serving as soil tilling tools form the spinner 94. These spinners 94 are journaled in the bottom 96 of the box beam 90 by means of the single bearing 95, which is a four-point bearing. The circumferential bearing groove configured as the race 98 for the rolling bodies in the form of balls 99 of the bearing 95 configured as a ball bearing is integral with the outside 97 of the cup-shaped prong holder 92. The two bearing ring halves 100 and 101 which can be divided on a horizontal plane form the outer bearing ring 102, the inner bearing ring 103 of bearing 95 being integral with the outside 97 of the cup-shaped prong holder 92. The two separable halves 100 and 101 forming the outer bearing ring are held in the bearing flange 104. The axial securing of the outer bearing rings 102 is accomplished by means of the ring 106 serving as a clamping means 105, which is fastened by bolt 107 to the bearing flange 104. The seal 108 inserted into the bearing flange 104 seals the bottom of the box beam 90 and prevents leakage of lubricants contained in the interior of the box beam 90 as well as the entry of dust and dirt particles into the box beam 90.

The bearing flange 104 bears the welded lugs 109 with which it is fastened in the box beam bottom 96. To permit the bearing flange 104 to be properly fastened in the box beam bottom 97, the lugs 109 have the centering elements 110. These centering elements 110 cooperate with the counter-centering elements 111 situated in the box beam bottom 96 in the form of bores. The bearing flange 104 is bolted to the box beam bottom 96 with the bolts 112.

To prevent stones from jamming between the individual prong holders 92 arranged side by side, the latter have in their bottom part the circular, plate-like closure 113. The bolts 115 are threaded into the blind holes 114 of the prong holder 92 to fasten the prongs 93. The prongs 93 are fastened to the prong holder each by means of two bolts 115.

The installation of the spinners 94 in the box beam 90 is performed in the following manner:

First the seal 108 is inserted into the bearing flange 104 and then the bottom half 101 of the outer bearing ring 102 is mounted in the bearing flange 104. Next, the bearing flange 104 is placed over the cup-shaped prong holder 92 and the balls 99 are loaded into the bearing race 98. The final assembly of the bearing 95 is accomplished by inserting the upper bearing ring half 100 and placing on it the ring 106 serving as clamping means 105 and bolting it in place. After that the spur gear 91 is threaded onto the prong holder 92 and the prongs 93 are fastened to the prong holder 91 by means of the bolts 115 either now or after the prong holder 93 is installed in the bottom 96 of the box beam. The preassembled component is now installed upwardly through a corresponding opening in the box beam bottom 96. After the centering elements 110 cooperate properly with the counter-centering elements 111, the component is fastened to the box beam bottom by means of the bolts 112.

What we claim is:

1. A soil tiller machine comprising an elongated box beam means extending transversely to the direction of travel of the tiller machine, a plurality of rotatable tiller means having tiller prongs for tilling soil, each of said rotatable tiller means comprising a cup-shaped member having an outer cylindrical surface and a bottom, fastening means fastening said tiller prongs to said bottom of said cup-shaped member, said outer cylindrical surface having an upper portion and an intermediate portion which is disposed between said upper portion and said bottom of said cup-shaped member, gear means mounted on said cup-shaped member at said upper portion of said outer cylindrical surface, a single bearing means for rotatably supporting said rotatable tiller means on said box beam means, said single bearing means being mounted on said outer cylindrical surface of said cup-shaped member at said intermediate portion thereof, said cup-shaped member comprising a one-piece integral rotatable member which mounts said prongs, said bearing means and said gear means, said bearing means mounted on said outer cylindrical surface of said cup-shaped member providing for a large sized bearing means having a diameter of at least one-third the diameter of the working circle of said rotating prongs, said plurality of rotatable tiller means being disposed in linear array along the longitudinal extent of said box beam means, said gear means on one rotatable tiller means meshing with the gear means located on opposite sides of said one rotatable tiller means such that all of said rotatable tiller means are rotated together by said gear means with alternate rotatable tiller means rotating in opposite directions, said gear means of each rotatable tiller means being disposed in a first common plane, said bearing means of each rotatable tiller means being disposed in a second common plane spaced from said first common plane.

2. A soil tiller machine according to claim 1, wherein said outer cylindrical surface has a groove, said bearing means comprising ball bearings rolling in opposed ball-supporting surfaces, said groove constituting one of said ball-supporting surfaces.

3. A soil tiller machine according to claim 1, wherein said cup-shaped member has a lower transverse portion, said prongs being fastened to said lower transverse portion.

4. A soil tiller machine according to claim 1, wherein said outer cylindrical surface of said cup-shaped member has a first bearing groove which forms part of said bearing means, said bearing means comprising ball bearings rollable on said first bearing groove, said bearing means further comprising an outer race ring means having a second bearing groove on which said ball bearings roll, said ball bearings having an operable position between said first and second bearing grooves, and mounting means mounting said outer race ring means on said box beam means.

5. A soil tiller machine according to claim 4, wherein said outer cylindrical surface of said cup-shaped member has a holder surface portion juxtaposed to said first bearing groove, said outer race ring means having a race ring portion juxtaposed to said second bearing groove, said race ring portion being spaced from said holder surface portion to define a ball opening therebetween, said ball bearings being assembled by passing said ball bearings through said ball opening to said operable position between said first and second bearing grooves.

6. A soil tiller machine according to claim 1, wherein said bearing means comprises ball bearings, said bearing means further comprising bearing support surface means on which said ball bearings rotate, said bearing support surface means comprising four support surfaces spaced from each other to thereby provide a four-point support for said ball bearings.

7. A soil tiller machine according to claim 1, wherein said bearing means comprises a self-contained bearing unit having ball bearings disposed between inner and outer race rings.

8. A soil tiller machine according to claim 1, wherein said bearing means comprises ball bearings and inner and outer race ring means, and mounting means removeably mounting said outer race ring means on said box beam means whereby said ball bearings are insertable between said inner and outer race ring means.

9. A soil tiller machine according to claim 8, wherein said mounting means comprises threaded fastening members fastening said outer race ring means to said box beam means.

10. A soil tiller machine according to claim 1, wherein said bearing means comprises ball bearings and inner and outer race ring means, said inner race ring means being integral with said rotatable tiller means.

11. A soil tiller machine according to claim 1, wherein said bearing means comprises ball bearings and inner and outer race ring means, and mounting means removeably mounting said inner race ring means on said rotatable tiller means.

12. A soil tiller machine according to claim 1, wherein said bearing means comprises ball bearings and inner and outer race ring means with said ball bearings being disposed between said inner and outer race ring means, said cup-shaped member and said bearing means being pre-assembled as a unit which is then mounted on said box beam means, and mounting means mounting said outer race means to said box beam means.

13. A soil tiller machine according to claim 12, wherein said gear means is part of said pre-assembled unit which is mounted on said box beam means.

14. A soil tiller machine according to claim 12, wherein said mounting means comprises first centering means on said outer race ring means cooperable with second centering means on said box beam means for accurately positioning said sub-assembly on said box beam means.

15. A soil tiller machine according to claim 12, wherein said box beam means has a top and a bottom, said box beam means having bottom openings in said bottom, said sub-assembly being assembled on said box beam means by passing said sub-assemblies into said box beam means through said openings.

16. A soil tiller machine according to claim 1 further comprising sealing means between said bearing means and said tiller means for sealing said bearing means from the external environment.

17. A soil tiller machine according to claim 16, wherein said sealing means comprises a plastic ring.

18. A soil tiller machine according to claim 17, wherein said plastic ring is made of a foamed plastic material.

19. A soil tiller machine according to claim 16, wherein said bearing means comprises ball bearings and inner and outer race ring means, said sealing means being mounted on said outer race ring means and on said tiller means.

20. A soil tiller machine according to claim 19, wherein said inner race ring means is integral with said tiller means.

21. A soil tiller machine according to claim 1, wherein said bearing means comprises ball bearings and inner and outer race ring means, said cup-shaped member along with said gear means and said inner race ring means being integrally formed in one piece.

22. A soil tiller machine according to claim 1, wherein said gear means and said cup-shaped member comprise cooperable mounting means for removeably mounting said gear means on said cup-shaped member.

23. A soil tiller means according to claim 1, wherein said bearing means comprises ball bearings and inner and outer race ring means, at least one of said race ring means being divided into two parts with one part overlying the other part in abutting relationship.

24. A soil tiller machine according to claim 23, wherein both of said inner and outer race ring means are divided into two parts with one part of each race ring means overlying the other respective part in abutting relationship.

25. A soil tiller machine according to claim 1, wherein said bearing means comprising ball bearings and inner and outer race ring means, said inner race ring means being integral with said cup-shaped member, said outer race ring means comprising two half ring portions separable along a generally horizontal plane passing through the center of said ball bearings.

26. A soil tiller machine according to claim 25 further comprising mounting means mounting one of said half ring portions on said beam box means.

27. A soil tiller machine according to claim 26 further comprising mounting means mounting said other half ring portion on said one half ring portion.

28. A soil tiller machine according to claim 1, further comprising external threads on said outer cylindrical surface of said cup-shaped member, said gear means comprising a gear element having a central opening defined by an internal cylindrical wall, internal threads on said internal cylindrical wall, said gear element being mounted on said holder member by engaging said external and internal threads.

29. A soil tiller machine according to claim 28, wherein one gear element mounted on one holder member by associated external and internal threads rotates in one direction and another gear element mounted on another juxtaposed holding member by associated external and internal threads rotates in an opposite direction, said one gear element meshing with said other gear element, said external and internal threads on said one gear element and on said one holder member being righthand threads, said external and internal threads on said other gear element and on said other holder member being lefthand threads.

30. A soil tiller machine according to claim 1 further comprising gear connecting means connecting said gear means to said cup-shaped member.

31. A soil tiller machine according to claim 1, wherein said cup-shaped member is integrally formed with said gear means from one piece of material.

* * * * *